April 6, 1937.  H. I. DOWNES  2,076,075
HYDRAULIC SCREW CLUTCH
Filed Jan. 10, 1936  3 Sheets-Sheet 1
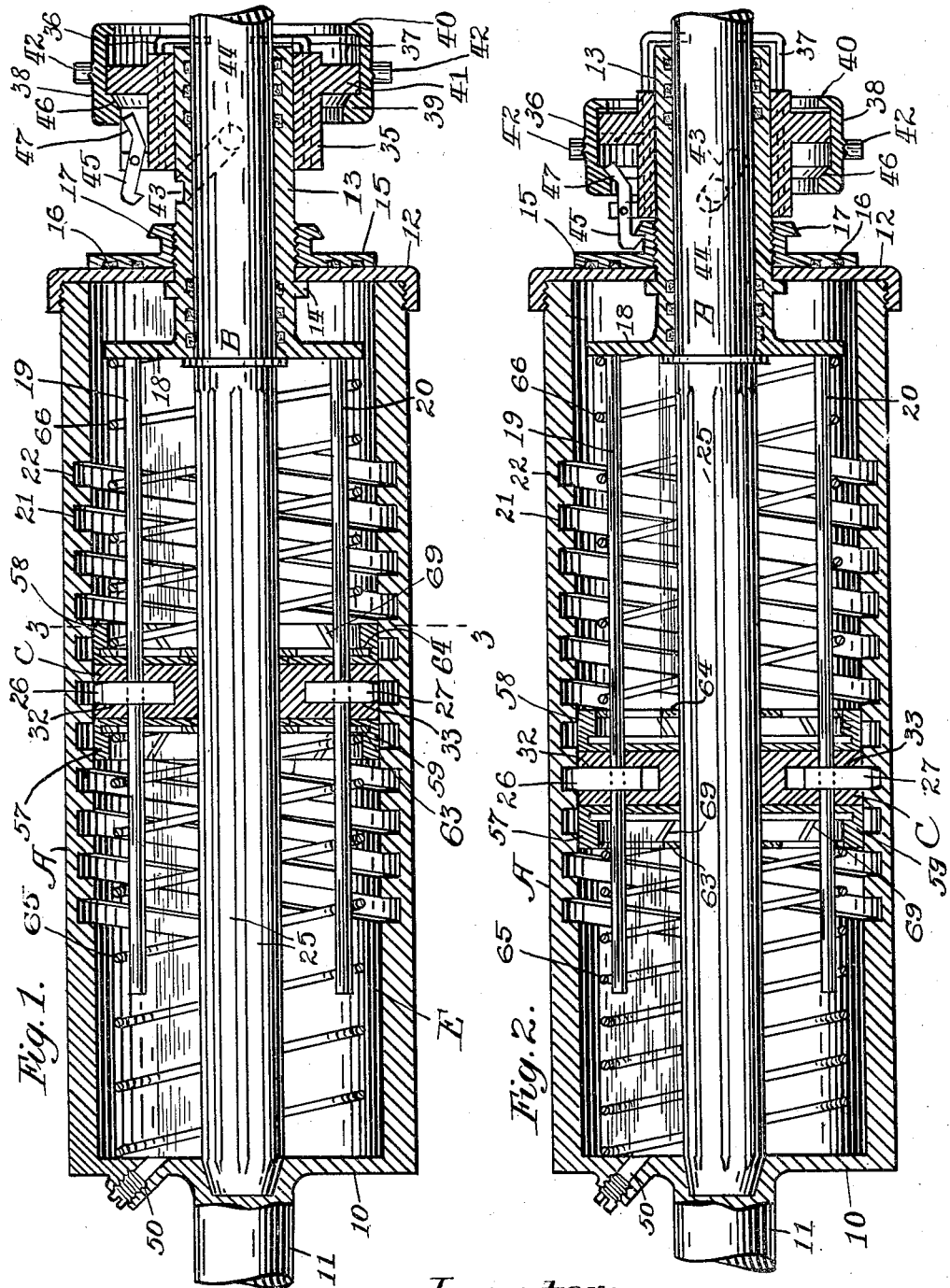
Inventor:
Harry I. Downes,
by: [signature]
Attorney.

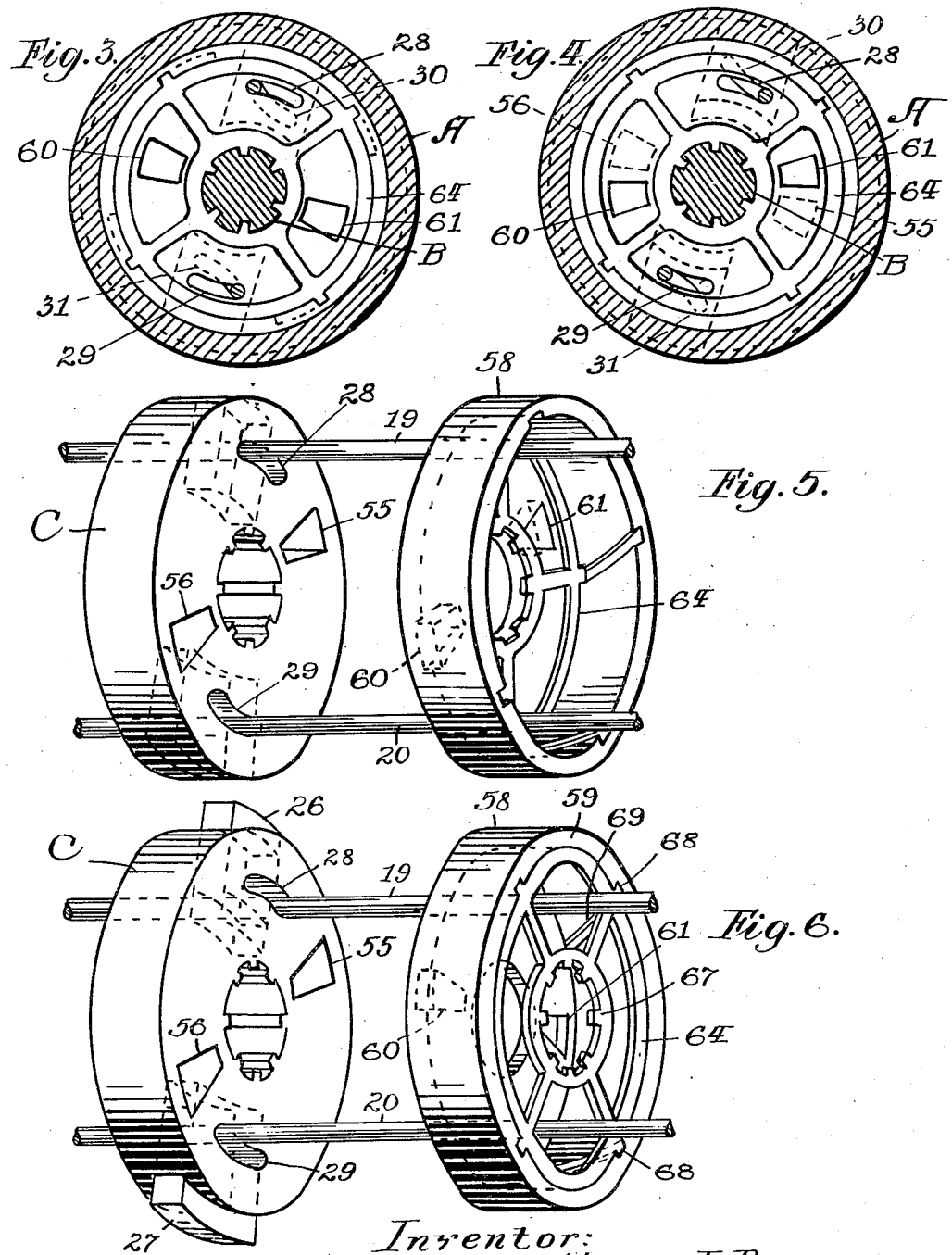

April 6, 1937. H. I. DOWNES 2,076,075
HYDRAULIC SCREW CLUTCH
Filed Jan. 10, 1936 3 Sheets-Sheet 3

Inventor:
Harry I. Downes,
by: [signature]
Attorney.

Patented Apr. 6, 1937

2,076,075

UNITED STATES PATENT OFFICE 2,076,075

HYDRAULIC SCREW CLUTCH

Harry I. Downes, Avalon, Calif.

Application January 10, 1936, Serial No. 58,558

11 Claims. (Cl. 192—32)

The invention, a specific form of which is herein described has to do generally with clutch mechanism, and although I herein explain the invention as embodied in one form of power transmission device it will be understood that the clutch of the present invention may be applied to various kinds and types of mechanism. It will also be understood that the invention is not necessarily limited to the specific details of structure hereinafter explained, these details being set out for the purpose of enabling those skilled in the art to understand fully and thoroughly, one form of device that embodies the invention and thereby to have a full and complete understanding of the invention itself.

An object of this invention is to provide a method of gradually transmitting rotary motion in either direction between two members either of which may be the driving or driven member. This method accomplishes a connection between the two members which cannot slip after the gradual connection has been effected but which will allow a yieldable or cushioning effect when rotation is reversed or when the two reverse their action as driving and driven members. It also provides an easily actuated means of connecting and quick disconnecting. Simply it is a method of screwing the two members together against a fluid cushion until the members are connected without slipping. A further object is the production of a device of the type stated which is not dependent upon the rate of movement of the operating member for clutching and which is substantially free from shock and jar while being used.

Figure 7:
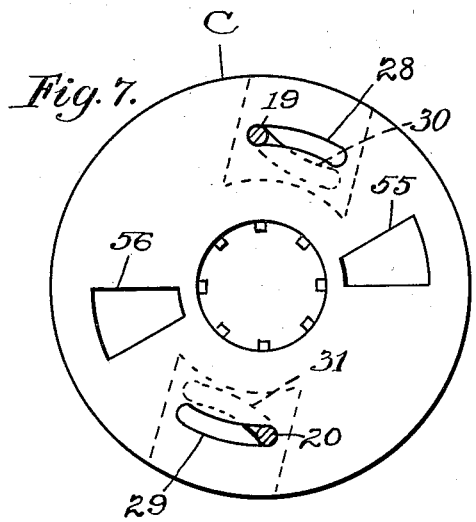
Figure 9:
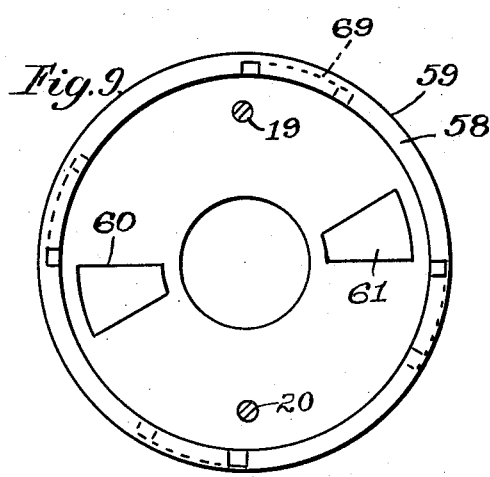
Figure 8:
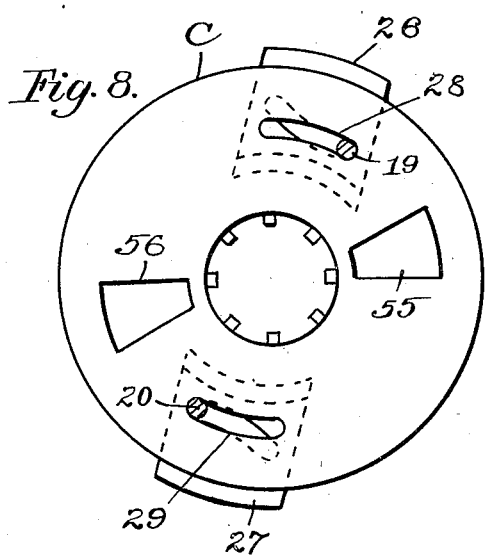
Figure 10:
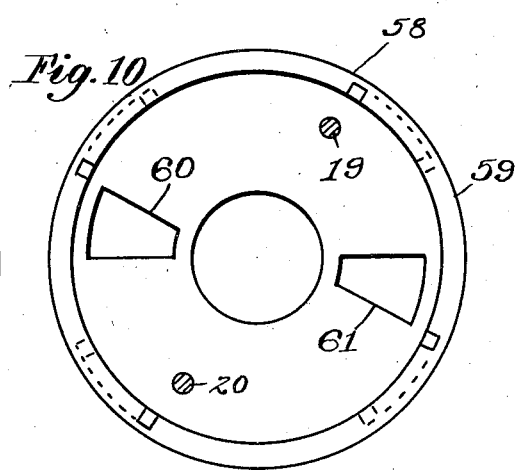

Referring to the accompanying drawings, forming part of this specification, Fig. 1 is a longitudinal central section of my improved clutch when the parts assume unapplied position; Fig. 2 is a view similar to Fig. 1 when the parts are applied; Fig. 3 is a section taken on line 3—3 of Fig. 1, when the parts are unapplied; Fig. 4 is a section similar to Fig. 3 when the parts are applied; Fig. 5 is a perspective view of one of the piston valves and grill elements removed from the clutch and separated, the relative position of the parts being shown as when in unapplied condition; Fig. 6 is a view similar to Fig. 5, the parts being shown as when in applied condition; Fig. 7 is an end view of the piston removed from the cylinder of the driving member when the cam followers are retracted; Fig. 8 is a view similar to Fig. 7 when the cam followers are expanded; Fig. 9 is an end view of the rotary piston valve removed from one end of the piston and from within the cylinder, its parts being relatively positioned to coincide with the open position of the valve openings through the piston as shown in Fig. 7, and Fig. 10 is a view similar to Fig. 9 when the parts assume a closed position relative to the valve openings shown in Fig. 8 and when the cam followers are expanded.

In the drawings, and for the purpose of describing one form of my invention, A indicates a hollow cylindrical housing having a closing head 10, integral with a drive shaft 11 and constituting a drive member and B indicates a shaft which is coaxial with the drive shaft and constitutes the driven member. These driving and driven members represent a couple, the members of which are adapted to be connected to transmit rotary motion or to be disconnected and allow the members to idle. The outer end of the cylinder is closed by the head 12 which is screw threaded onto the cylinder and plated with tin or other suitable material to produce a fluid tight joint. The cylinder provides a fluid holding chamber E for purposes to be hereinafter stated. Shaft B is journaled in a sleeve 13, which in turn is journaled in head 12 and is held longitudinally from longitudinal outward movement by shoulder 14. A flanged collar 15 secured to sleeve 13 holds the sleeve from longitudinal inward movement. This collar has its flange provided with packing rings 16 against the side of head 12 to produce a leak proof joint and is formed with an annular beveled lock shoulder 17, the function of which will be hereinafter set forth. Sleeve 13 is provided with an inner circular flange 18 and this flange carries a pair of longitudinal forwardly extending cam follower functioning rods 19 and 20, which are positioned diametrically opposite one another. The forward end of shaft B is journaled in the closing head 10. These rods and the sleeve 13 by which they are carried are adapted to rotate in and about the cylindrical housing through a short arc as will be hereinafter described. The inner cylindrical surface of the housing is screw threaded to form a pair of parallel cam grooves or cams 21 and 22. For the purpose of this description the forward end of the device is longitudinally toward shaft 11.

Shaft B is grooved longitudinally to form splines 25 within the housing and engaged by said splines to slide on the shaft and revolve therewith is a piston C, closely fitting the cylinder and carrying a pair of diametrically opposite and radially movable cam followers 26 and 27, which are slidably mounted in closely fitting radiating guide openings 32 and 33 in the piston. These cam followers either recede simultaneously fully into the piston or project radially outwardly from the periphery of the piston into engagement with the threads formed by the helical grooves 21 and 22. The pitch of the grooves is such that one cam follower will engage one thread while the other simultaneously engages the companion thread. When expanded the cam followers assist in converting rotary motion of the housing into longitudinal reciprocable motion of the piston head. Expanding and retracting action of the cam followers is accomplished by the arcuate movement of the actuating rods 19 and 20, which have free limited travel in arcuate slots 28 and 29 in the piston and which extend through actuating grooves 30 and 31 in said cam followers. The latter grooves serve to impart expanding radial movement to the cam followers while the cam follower actuating rods are rotated through a short arc concentric with the driving and driven members of the primary couple.

The controlling movement or partial rotation of sleeve 13 may be accomplished in several ways. As here illustrated a ring 35 freely rotative on sleeve 13 is splined to shaft B by the guide rods 36 and 37 so that it may slide freely longitudinally on said sleeve. This ring is caused to slide by an annular collar 38 which has a pair of inwardly projecting longitudinally spaced annular shoulders 39 and 40 between which a radiating annular shoulder 41, integral with ring 35, plays. Operating collar 38 has a pair of gudgeons 42 which are adapted to be engaged by any operating member desired and of usual construction, such as a lever, (not shown) to slide the collar longitudinally relative to shaft B while the collar is held from rotation with the shaft. A cam groove 43 in the outer surface of sleeve 13 and a companion engaging pin 44 projecting inwardly from ring 35 converts the forward sliding movement of ring 35 into the short arc rotary movement of the cam follower operating rods 19 and 20 and consequently causes the cam followers to be thrust outwardly and expanded into engagement with the cam threads of the driving member A, and vice versa, return sliding movement of ring 35 due to the reversal of the operating collar 38 reverses this action and retracts the cam followers inwardly out of engagement with the cam threads. At the end of the full forward stroke of the operating collar 38, a pivoted locking pawl 45 on collar 35 automatically engages the annular beveled shoulder 17 and locks the operating mechanism with the cam followers 26 and 27 applied. Reverse movement of operating collar 38 first causes inwardly projecting beveled annular shoulder 46 to slide over a guide shoulder piece 47 on the locking pawl 45 and tilt the pawl out of engagement with shoulder 17 and the shoulder 39 to next engage shoulder 41 and move the collar 35 into fully retracted position with the cam followers 26 and 27 unapplied. It will be noted that sufficient lost motion is provided between shoulders 39 and 40 to cause the operation of the pawl 45. Double screw threading of the cylinder is employed to balance piston C, also to permit placing the cam followers 26 and 27 transversely and diametrically opposite.

In operation, the chamber E within the housing A is filled three fourths (more or less) with liquid such as thin oil, leaving the remaining unfilled space occupied by cushioning air, a plugged opening 50 being provided for that purpose. The operator causes the operating collar 38 to slide forwardly until the pawl 45 engages beveled shoulder 17, whereupon the cam followers 26 and 27 are applied to the threads of the cylinder and the rotation of the drive member A causes the piston C to travel forwardly against the liquid and fluid cushion in the cylinder until enough oil and air cushion is encountered to overcome the resistance of the load of driven member B, whereupon the driving and driven members are connected and the driven member caused to revolve evenly with the driving member. When the operator reverses the operating collar, the clutch is disconnected from applied condition, member 38 causing the operating rods 19 and 20 to withdraw the cam followers from engagement with the cylinder. Pressure of the piston against the oil and air in the compression chamber releases the clutch from further engagement between the driving and driven members and the piston quickly returns to normal starting position.

To assist in producing a substantially perfect liquid and fluid seal and to equalize the level of liquid and pressure of air on the compression and exhaust sides of the piston in the cylinder when the piston assumes median position, a pair of diametrically opposite ducts 55 and 56 (see Fig. 5) are provided longitudinally through the piston and circular rotative piston valves 57 and 58 closely fitting the cylinder are placed over the opposite sides of the piston. Each rotary piston valve is cupped outwardly to produce a flange 59 and the cam follower actuating rods 19 and 20 engage through the body of each rotary piston valve so that the rotary piston valves will rotate concentrically about the axis and upon the ends of the piston through a short arc. Port passages such as 60 and 61 through the body of each rotary piston valve are adapted in the applied condition of the parts of the clutch and while the ports are approaching applied position to seal ducts 55 and 56 and in the unapplied position of the parts and while approaching unapplied condition to open said ports and allow the liquid and air on the opposite sides of the piston to equalize.

Compression springs 65 and 66 exerting sufficient pressure towards the opposite sides of the piston balance the piston while the latter is in median position between the ends of the cylinder. These springs also assist in retracting the piston. Circular grills 63 and 64, one in each rotary piston valve has imparted to it sufficient longitudinal movement to compress the energy of the springs and release the rotary valves during the compression movement of the piston and to apply the increased energy exerted by the springs while the piston is returning to and reaches unapplied condition of the clutch. Each grill is splined by the inwardly projecting teeth 67 to driven shaft B so that it is forced to revolve in unison with the piston C. It is also caused to recede and travel on the shaft into its companion rotary valve while the clutch parts are approaching applied condition by cam lugs 68 engaging and traveling in cam grooves 69 in the inner wall of the rotary valve. The equalizing port passages 55 and 56 in the piston are sealed while the piston approaches applied position and are opened while the piston is retracting to neutral position, automatically and the liquid and air pressure equalized on both sides of the piston when the latter approaches and reaches neutral or median position. Thus the liquid and air cushion always returns to equal and normal condition on the opposite sides of the piston at the starting point when the clutch is operated to connect the driven element with the driving element.

The piston assembly shown is not necessarily a perfect fluid seal but it sufficient to produce a cushioning effect when the assembly moves forward. In case of leakage the piston gradually advances to compensate therefor until the cam followers reach the forward ends of the screw threads 21 and 22, whereupon a positive connection is made between the driving and driven elements. In this condition spring 65 will quickly return the piston to unapplied condition when the cam followers are disconnected from the threading in the cylinder by the disconnecting movement of the clutch operating element 38.

While I have described each helical thread in the cylinder as a cam and members 25 and 26 on the piston as cam followers, it will be understood that these terms include any type of cam members as equivalents within the spirit of my invention and of the claims following.

In accordance with the patent statutes, I have described the principles of operation of my invention together with the construction thereof which I now consider to represent the best embodiment thereof, but I desire to have it understood that the apparatus shown is only illustrative and that the invention can be carried out by other means and applied to uses other than those above set forth within the scope of the following claims.

Having described my invention, what I claim as new and desire to secure by Letters Patent is:

1. Clutch mechanism, comprising, in combination, two cooperating rotary driving and driven elements having a cylinder on one member and a reciprocable piston in said cylinder on the other member, said cylinder being adapted to contain fluid medium compressible under the action of a compression stroke of said piston and having a cam shoulder, a cam follower connected with said piston adapted to engage or disengage said shoulder and by which the piston is reciprocated to compress said fluid medium sufficiently to transmit the driving motion of the driving member to the driven member, and means for applying or releasing said follower.

2. Clutch mechanism, comprising, two cooperating rotary driving and driven elements, having a cylinder on one element and a piston reciprocable in said cylinder and rotatable with the other element, said cylinder being adapted to hold fluid medium compressible by a stroke of said piston, cam mechanism between the periphery of said piston and the inner wall of said cylinder by which motion of the driving element is caused to reciprocate said piston and compress said fluid medium sufficiently to transmit said driving motion to said driven element and means applicable within the cylinder and operable from without for applying or releasing said cam mechanism.

3. Clutch mechanism, comprising, two cooperating rotary driving and driven elements, having a cylinder on one element and a piston reciprocable in said cylinder and rotatable with the other element, said cylinder being adapted to hold fluid medium compressible by a reciprocable stroke of said piston, cam mechanism between the periphery of said piston and the inner wall of said cylinder by which rotary motion of the driving element is caused to reciprocate said piston and compress said fluid medium sufficiently to transmit said rotary motion to said driven element, said cam mechanism having an expansible connecting and disconnecting element by which said cam mechanism is caused to function, and means applicable within the cylinder and operable from without for operating said expansible element from without said cylinder.

4. Clutch mechanism, comprising, two cooperating rotary driving and driven elements, having a cylinder on one element and a piston reciprocable in said cylinder and rotatable with the other element, said cylinder being adapted to hold fluid medium compressible by a reciprocable stroke of said piston, cam mechanism between the periphery of said piston and the inner wall of said cylinder by which rotary motion of the driving element is caused to reciprocate said piston and compress said fluid medium sufficiently to transmit said rotary motion to said driven element, said cam mechanism having cams on the inner cylindrical wall of the cylinder and a pair of cam engaging followers reciprocable into and out from the piston, and means operable from without the cylinder for reciprocating said followers.

5. Clutch mechanism, comprising, two cooperating rotary driving and driven elements, having a cylinder on one element and a piston reciprocable in said cylinder and rotatable with the other element, said cylinder being adapted to hold fluid medium compressible by a reciprocable stroke of said piston, cam mechanism between the periphery of said piston and the inner wall of said cylinder by which rotary motion of the driving element is caused to reciprocate said piston and compress said fluid medium sufficiently to transmit said rotary motion to said driven element, said cam mechanism having cams on the inner cylindrical wall of the cylinder and a pair of cam followers reciprocable outwardly from the periphery of said piston into engagement with said cams and inwardly out of applied position, means for actuating said followers outwardly and inwardly, and means for operating said actuating means.

6. The combination of a rotary driving shaft, a rotary driven shaft, an intermediate part having a piston movably connected with one of said shafts and a cooperating cylinder connected with the other of said shafts, said piston and cylinder forming a fluid compression chamber, means applicable into and out of connection with said cylinder for reciprocating said piston from normal position and compressing the fluid in said chamber sufficiently to transmit the rotary motion of the driving shaft to the driven shaft, and valved means connecting the ends of said chamber within the cylinder to equalize the condition of fluid on the opposite sides of said piston as the latter returns to normal position.

7. The combination of a rotary driving shaft, a rotary driven shaft, a piston slidably connected with one of said shafts and a cooperating cylinder connected with the other of said shafts and having a cam, said piston and cylinder forming a fluid compression chamber, a cam follower applicable into and out of connection with said cam for causing the reciprocation of said piston from normal position and compressing the fluid in said chamber sufficiently to transmit the rotary motion of the driving shaft to the driven shaft, valved means through the piston connecting the spaces in said cylinder on the opposite sides of the piston to equalize the pressure of fluid therein as the piston returns to normal position, and means for assisting the return of the piston to normal position when the cam follower is disengaged from said cam.

8. The combination of a rotary driving shaft, a rotary driven shaft, a piston slidably connected with one of said shafts and a cooperating cylinder connected with the other of said shafts, said piston and cylinder forming a fluid compression chamber, and said cylinder being internally threaded, means carried by the piston and applicable into and out of connection with the threading on said cylinder for transmitting the rotary motion of one of said shafts and reciprocating said piston from normal position thus compressing the fluid in said chamber sufficiently to transmit the rotary motion of the driving shaft to the driven shaft, and valved means through the piston connecting the spaces in said cylinder on the opposite sides of the piston to equalize the pressure of fluid therein as the piston returns to normal position.

9. The combination of a pair of coaxial rotary driving and driven shafts, a piston slidably connected with one of said shafts and a cooperating cylinder connected with the other of said shafts, said piston and cylinder forming a fluid compression chamber and said cylinder being internally threaded to produce a cam, a cam follower carried by the piston and applicable into and out of connection with the threading on said cylinder for transmitting the rotary motion of one of said shafts and reciprocating said piston from normal position thus compressing the fluid in said chamber sufficiently to transmit the rotary motion of the driving shaft to the driven shaft, said piston having a passage therethrough connecting the spaces in said cylinder on the opposite sides of the piston to equalize the pressure of fluid therein as the piston returns to normal position, a valve cooperating with said passage and rotative about the axis of said shafts and means also rotative about the axis of said shafts for simultaneously operating said cam follower and valve.

10. The combination of a pair of coaxial rotary driving and driven shafts, a piston slidably connected with one of said shafts and a cooperating cylinder connected with the other of said shafts, said piston and cylinder forming a fluid compression chamber, and said cylinder being internally threaded to produce a cam, a cam follower carried by the piston and applicable into and out of connection with the threading on said cylinder for transmitting the rotary motion of one of said shafts and reciprocating said piston from normal position thus compressing the fluid in said chamber sufficiently to transmit the rotary motion of the driving shaft to the driven shaft, said piston having a passage therethrough connecting the spaces in said cylinder on the opposite sides of the piston to equalize the pressure of fluid therein as the piston returns to normal position, a valve cooperating with said passage and rotative about the axis of said shafts, and means connected with said valve, rotative through an arc and operative from without the cylinder for closing said valve and having an actuating connection with said cam follower whereby the cam follower is moved into and out of connection with said threading in unison with the closing and opening of said valve.

11. The combination of a pair of coaxial rotary driving and driven shafts, a piston slidably connected with one of said shafts and a cooperating cylinder connected with the other of said shafts, said piston and cylinder forming a fluid compression chamber and said cylinder being internally threaded to form a cam, a cam follower carried by the piston and applicable into and out of connection with the thread on said cylinder for transmitting the rotary motion of one of said shafts and reciprocating said piston from normal position, thus compressing the fluid in said chamber sufficiently to transmit the rotary motion of the driving shaft to the driven shaft, said piston having a passage therethrough and connecting the spaces in said cylinder on the opposite sides of the piston to equalize the pressure of fluid therein as the piston returns to normal position, a valve cooperating with said passage and rotative about the axis of said shafts, means connected with said valve and having a connection with said cam follower whereby the cam follower is moved into and out of connection with said thread in unison with the closing and opening of said valve, a grill in said valve having a connection therewith and operative by the rotative movement of the valve to move outwardly from the valve towards the corresponding end of the cylinder, and a spring between said grill and the end of the cylinder adapted to be compressed by the outward movement of the grill and to assist in returning the piston to normal position after the release of said cam follower from said thread.

HARRY I. DOWNES.